(12) United States Patent  
Sarabandi et al.

(10) Patent No.: US 11,875,708 B2  
(45) Date of Patent: Jan. 16, 2024

(54) AUTOMOTIVE RADAR SCENE SIMULATOR

(71) Applicant: THE REGENTS OF THE UNIVERSITY OF MICHIGAN, Ann Arbor, MI (US)

(72) Inventors: Kamal Sarabandi, Ann Arbor, MI (US); Xiuzhang Cai, Ypsilanti, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 851 days.

(21) Appl. No.: 16/579,959

(22) Filed: Sep. 24, 2019

(65) Prior Publication Data

US 2020/0111382 A1 Apr. 9, 2020

Related U.S. Application Data

(60) Provisional application No. 62/741,232, filed on Oct. 4, 2018.

(51) Int. Cl.
| | |
|---|---|
| *G09B 9/54* | (2006.01) |
| *G01S 13/93* | (2020.01) |
| *G01S 7/41* | (2006.01) |
| *G01S 7/40* | (2006.01) |
| *G01S 13/931* | (2020.01) |

(52) U.S. Cl.
CPC .............. *G09B 9/54* (2013.01); *G01S 7/4052* (2013.01); *G01S 7/415* (2013.01); *G01S 13/931* (2013.01); *G01S 7/4091* (2021.05)

(58) Field of Classification Search
CPC .......... G09B 9/54; G01S 7/415; G01S 13/931; G01S 7/4091; G01S 7/4052; G01S 13/89; G01S 13/867; G01S 13/42; G01S 13/865; G01S 7/417; G01S 17/931; G01S 7/412
See application file for complete search history.

(56) References Cited

U.S. PATENT DOCUMENTS

| 5,388,234 A | * | 2/1995 | Kanno | .............. G06F 16/90344 |
| | | | | 707/E17.041 |
| 6,580,388 B1 | * | 6/2003 | Stoyanov | ................ G01S 7/411 |
| | | | | 342/195 |
| 6,950,057 B1 | * | 9/2005 | Mussell | ................ G01S 7/4052 |
| | | | | 342/170 |

(Continued)

FOREIGN PATENT DOCUMENTS

| AT | 521120 A1 * 10/2019 | ............. G01S 13/42 |
| CN | 205750723 U * 11/2016 | |

(Continued)

*Primary Examiner* — Bernarr E Gregory  
*Assistant Examiner* — Juliana Cross  
(74) *Attorney, Agent, or Firm* — Harness, Dickey & Pierce, P.L.C.

(57) ABSTRACT

A real-time automotive radar simulation tool is developed based on reduced statistical models summarized from physical-based asymptotic and full-wave simulations. Some models have been verified with measurements. The simulation tool can help save cost and time for the automotive industry, especially for autonomous vehicles. The simulation tool can also help develop new functionalities like target identification or classification as well as help prevent false alarms.

19 Claims, 12 Drawing Sheets

(56) References Cited

U.S. PATENT DOCUMENTS

| | | | | |
|---|---|---|---|---|
| 7,424,408 | B1* | 9/2008 | Crabtree | G01S 7/4052 |
| | | | | 703/2 |
| 9,575,161 | B1* | 2/2017 | Haghighi | G01S 13/931 |
| 11,313,949 | B2* | 4/2022 | Kipp | G01S 7/412 |
| 2014/0201126 | A1* | 7/2014 | Zadeh | A61B 5/165 |
| | | | | 706/52 |
| 2017/0132335 | A1* | 5/2017 | Pechberti | G06F 30/20 |
| 2018/0060725 | A1* | 3/2018 | Groh | G06N 3/08 |
| 2018/0192919 | A1* | 7/2018 | Nakayama | G01S 13/89 |
| 2019/0266301 | A1* | 8/2019 | Abbosh | G06F 30/23 |
| 2020/0065443 | A1* | 2/2020 | Liu | G06F 11/3664 |
| 2020/0107249 | A1* | 4/2020 | Stauffer | G01S 13/42 |
| 2020/0158855 | A1* | 5/2020 | Blanche | G01S 13/9011 |
| 2022/0121884 | A1* | 4/2022 | Zadeh | G06F 16/953 |

FOREIGN PATENT DOCUMENTS

| | | | | |
|---|---|---|---|---|
| CN | 106250854 | A | * 12/2016 | |
| EP | 3260875 | A1 | * 12/2017 | G01S 13/90 |
| WO | WO-2017222385 | A1 | * 12/2017 | G01S 13/90 |

* cited by examiner

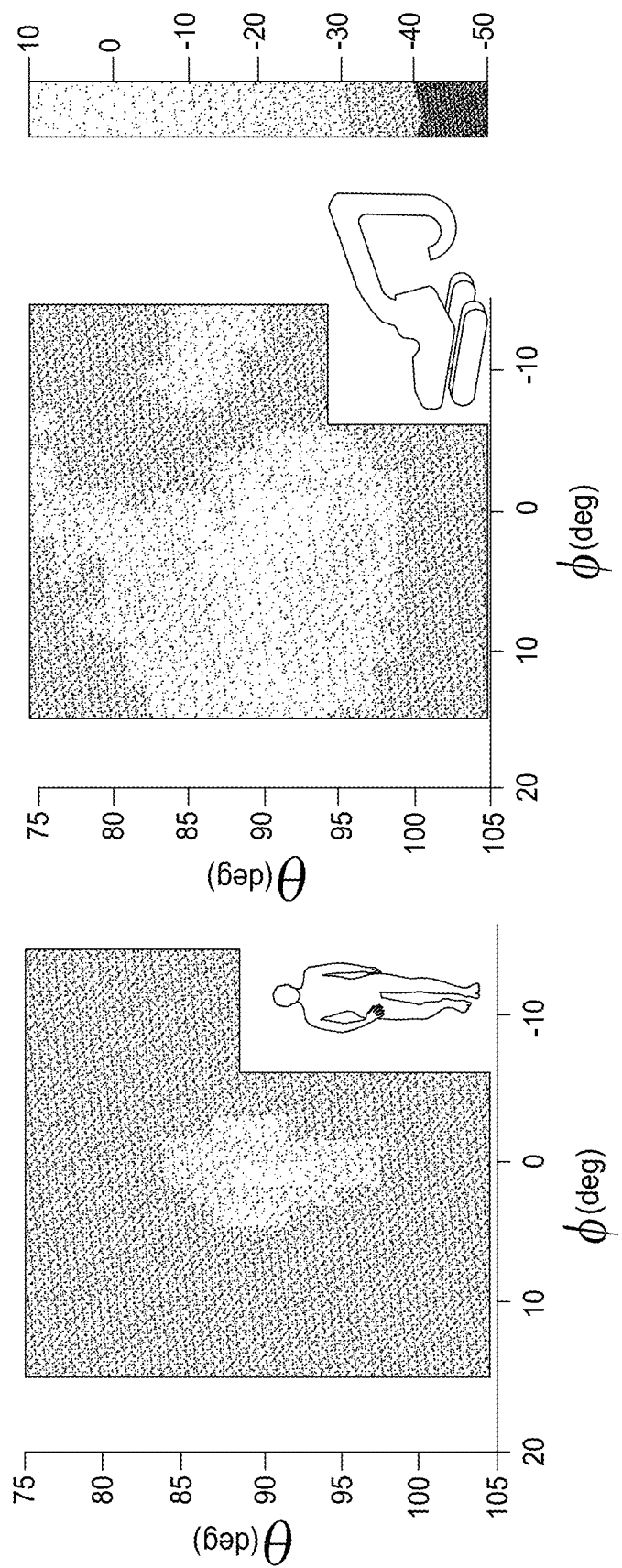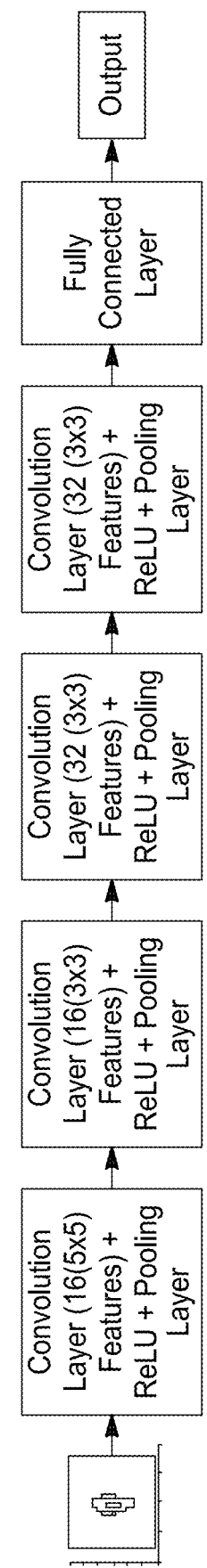
FIG. 10B
FIG. 10C

AUTOMOTIVE RADAR SCENE SIMULATOR

CROSS-REFERENCE TO RELATED APPLICATIONS

This application claims the benefit of U.S. Provisional Application No. 62/741,232, filed on Oct. 4, 2018. The entire disclosure of the above application is incorporated herein by reference.

FIELD

The present disclosure relates to an automotive radar scene simulator and a technique for constructing reduced statistical models for a target captured by radar.

BACKGROUND

Safety is always one of the most important issues on road. To adopt any sensor for vehicles, safety and reliability mandates millions of miles of road test under variety of conditions. Sensors for autonomous vehicles must also satisfy performance requirements for road tests and reliability. Sensors like radar, Lidar and cameras are envisioned for driverless cars. It is anticipated that an array of such sensors working in harmony are needed to complement each other's ability to map the environment and detect hazardous objects. One difficulty in road tests is acquiring the information about the environment while sensor measurements are being acquired. This is needed to correlate the events associated with false or missed detections. Compared to road testing, high fidelity simulation can provide much more reliable sensor data having exact ground truth. Another important advantage of sensor assessment in simulation domain is much lower cost and saving exorbitant amount of time needed for collecting data in driving environment. It simulation domain, it is also possible to easily construct some extreme traffic conditions that are rare in reality. Among the three main aforementioned sensors, simulation of traffic environment is most difficult and counter intuitive for radar sensors. The disclosed invention describes an approach to perform real-time and physics-based radar simulation of dynamic traffic environment. This automotive radar simulation tool is to provide backscattering simulations for different moving and stationary targets typically encountered in urban, rural, and highway environments.

This section provides background information related to the present disclosure which is not necessarily prior art.

SUMMARY

This section provides a general summary of the disclosure, and is not a comprehensive disclosure of its full scope or all of its features.

A computer-implemented method is presented for constructing reduced statistical models for a given target captured by an automotive radar. The method includes: identifying one or more attributes for the given target; selecting an initial set of values for one or more radar parameters; determining, by an electromagnetic field solver, a plurality of radar cross-section values for the given target using the initial set of values while randomly varying values for the one or more target attributes; and constructing parametric statistical model for the given target from the plurality of radar cross-section values. The method may further include selecting a different set of values for the one or more radar parameters; and determining additional radar cross-section values for the given target using the different set of values while randomly varying values for the one or more target attributes.

Values for the one or more target attributes may be varied, for example, using a Monte Carlo method; and the plurality of radar cross-section value can be determined, for example using a physical optics method In one example, the given target is further defined as a person and the target attributes include pose, gender, weight and height. Examples of radar parameters include but are not limited to incidence angle with respect to the given target and range to the given target.

In an example embodiment, the parametric statistical model is further defined by parameters of one of an exponential distribution function, a Lognormal distribution function or a Weibull distribution function. Additionally, the parameters of one of an exponential distribution function, a Lognormal distribution function or a Weibull distribution function are derived as a function of the incidence angle with respect to the given target and the range to the given target.

In another example embodiment, the parametric statistical model is further defined by a mean of an exponential distribution function of the plurality of radar cross-section values and a standard deviation of the exponential distribution function of the plurality of radar cross-section values. In other embodiments, the statistical models for a given target may vary with different types of radar. For example, single-input single-output radar may only need one radar cross-section value to represent the target; whereas, multiple-input multiple-output radar requires one or more scatters with random radar cross-section values generated by statistical model.

Additionally, the method further includes generating a scene on a display device, where the scene includes the given target and the given target is derived from the parametric statistical model for the given target.

In another aspect, the computer-implemented method for constructing a reduced statistical model for a given target is comprised of: identifying one or more attributes for the given target; selecting a set of values for one or more radar parameters; determining a plurality of radar cross-section values for the given target using the set of values; and constructing parametric statistical model for the given target from the plurality of radar cross-section values.

In one embodiment, determining a plurality of radar cross-section values includes capturing a first set of radar cross-section values with a radar, defining a function using the first set of radar cross-section values and radiative transfer theory, generating additional sets of radar cross-section value with the function.

In another embodiment, determining a plurality of radar cross-section values includes generating the plurality of radar cross-section values for the given target with an electromagnetic field solver by using the initial set of values while randomly varying values for the one or more target attributes.

In one example, the given target is further defined as a road surface and the target attributes include road type and road condition. Example radar parameters include but are not limited to polarization and incidence angle with respect to the given target.

In another example, the given target is further defined as a person and the target attributes include pose, gender, weight and height.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 10A and 10B are radar images generated by numerical simulation with beam-steering radar in azimuth direction and in both elevation and azimuth direction, respectively;

FIG. 10C is a flow diagram illustrating an example of a convolutional neural network for radar image identification by an object identifier;

Corresponding reference numerals indicate corresponding parts throughout the several views of the drawings.

DETAILED DESCRIPTION

Example embodiments will now be described more fully with reference to the accompanying drawings.

Figure 1:
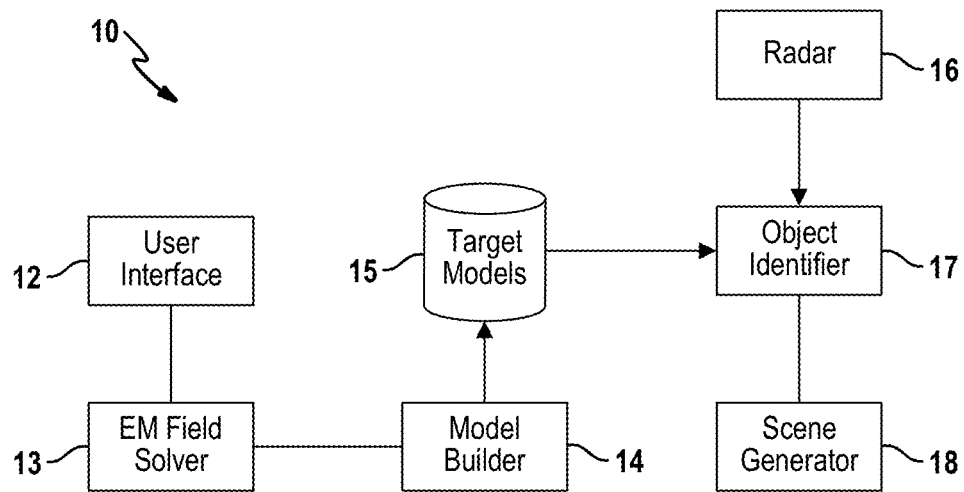
FIG. 1 is a block diagram of an example embodiment of an automotive radar scene simulator.

FIG. 1 depicts an example embodiment for an automotive radar scene simulator 10. The main challenge of radar simulation is to calculate the solution to the complex electromagnetic (EM) scattering from different irregular objects, such as traffic signs, pedestrian, and vehicles (referred to as point targets), as well as random rough surfaces and random volumes (referred to as distributed targets). Maxwell's equations for boundary value problems are not only difficult to formulate, but also computationally time consuming. The radar scattering solution is a function of target parameters (such as its geometry and material properties) as well as radar attributes (such as frequency, polarization, and incident angle). Depending on the size of the target, the antenna beamwidth, and the range, the target may be partially illuminated by the radar. In this case, the radar cross section of the target is also a function of radar distance to the target. As most targets encountered in traffic scenes are very large compared to the wavelength, variations of radar cross section with respect to aspect angle is very fast and the level of fluctuations is high. The reason for this is that there are many scattering points on a typical target whose scattering contributions can add constructively or destructively depending on the radar aspect angle. Another level of complexity is the statistical variations of targets encountered. For example, there are many different shapes and size of vehicles, pedestrians, traffic signs, road surfaces, etc.

To develop a realistic and real time radar simulator, the radar backscatter behavior of targets must be pre calculated. An electromagnetic field solver 13 together with radar measurements cooperatively operates with a model builder 14 to construct statistical models for potential targets in a scene. Noting the statistical nature of targets, targets are preferably categorized into different groups and, for each group, important attributes of the target (with its statistical parameters) are identified. Although more or less groups are contemplated by this disclosure, targets on a road may be grouped into three categories: pedestrians, vehicles and stationary objects. Within each category, there may be multiple sub-groups. For example, pedestrians may be grouped into walking and running/jogging sub-groups. Vehicles may include but are not limited to subgroups for bicycles, motorcycles, sedans, trucks, buses, etc. Similarly, stationary objects may include but are not limited to sub-groups for signs, trees, shrubs, road surfaces, etc.

Figure 2:
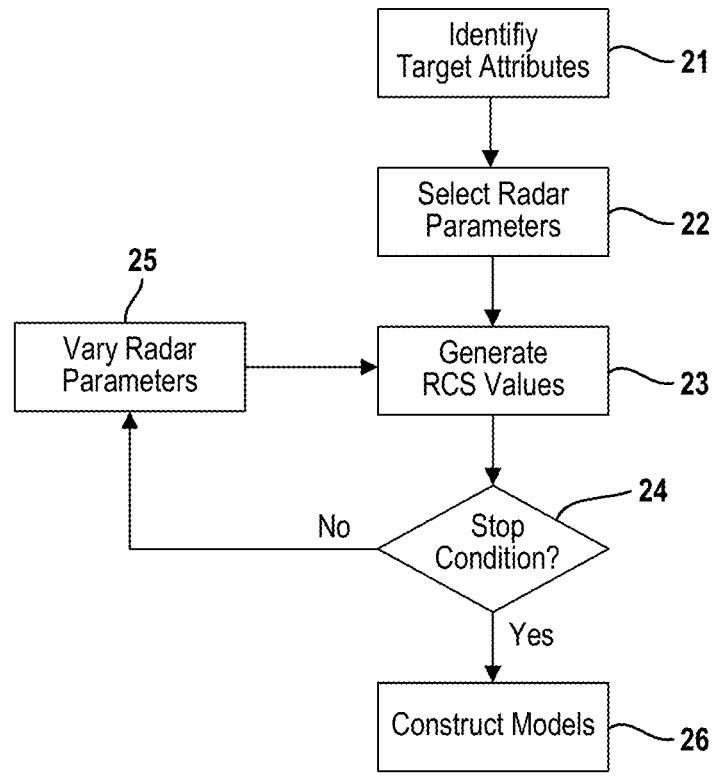
FIG. 2 is a flowchart depicting an example embodiment of a method for constructing a statistical model for a target in a scene.

FIG. 2 illustrates an example method for constructing a statistical model for a given target which may be implemented by the scene simulator 10. For each subgroup, attributes for the targets in the subgroup are identified at 21. Example attributes for a person/pedestrian include but are not limited to gender, weight, height and pose. These attributes are merely illustrative and different attributes for persons are readily envisioned. Likewise, different attributes are envisioned for the objects in other subgroups. In the example embodiment, the attributes for the targets in a subgroup may be specified and/or input using a user interface module 12 of the scene simulator 10.

Radar cross-section values are then generated for a given target, for example using an electromagnetic field solver 13. The radar cross-section values for the given target are generated by varying the values of the target attributes and varying the values of the radar parameters. For example, an initial set of values are selected at 22 for the one or more radar parameters. In an example embodiment, values are selected for an incidence angle for the radar with respect to the given target and a range from the radar to the given target. Other types of radar parameters are contemplated including but are not limited to frequency and/or polarization of radiation emitted by the radar.

A plurality of radar cross-section values for the given target are then determined at 23 using the initial set of values for the radar parameters by varying the values for the one or more target attributes. In one example, the values for the target attributes are varied using a Monte Carlo method although other methods are contemplated as well.

Over the past few decades many different electromagnetic numerical methods have been developed that can accurately characterize the EM scattering from finite size objects. Some of these methods include (but are not limited to) the Finite Element Method (FEM) which can easily handle inhomogeneous objects, the Method of Moment (MoM) which is computationally faster than FEM for metallic objects, and the Finite-Difference Time-Domain method (FDTD) which can handle inhomogeneous objects over a wide bandwidth. These are known as full-wave solutions and can provide the most accurate solution to an arbitrary object so long as the dimensions of the object are not very large compared to the wavelength. There are commercially available simulation tools, like AnsysEM (HFSS), EmCube, FEKO and CST, that are based on the aforementioned full-wave methods. Application of these software tools to targets whose typical dimensions are large compared to the wavelength are very time consuming and require significant computational resources.

At the millimeter-wave band, where most automotive radars operate (77 GHz), the wavelength is 3.9 mm and typical dimensions of a vehicle is on the order of few meters. For such targets, the target dimensions are on the order of 1000 wavelength and the required computational resources and computation time for full-wave analysis are large. As an example, for a random rough surface with dimensions about 4 cm by 4 cm, which is about 10 wavelengths by 10 wavelengths at the automotive radar frequency, a single incident angle backscatter simulation requires more than 20 CPU hours and 200 GB of memory. Hence, for large targets, approximate analytical solutions can be used. Because the dimensions of most targets encountered on road are larger than the wavelength, the scattering behavior of millimeter wave from such objects is similar that of light. In the example embodiment, an asymptotic method known as physical optics method (PO) is applied to the scattering problem for targets such as vehicles, pedestrians, traffic signs, lamp posts, etc. Physical optics method is based on tangent plane approximation, i.e., it is assumed that the principle radii of curvature on the lit area of the object are larger than the wavelength. Under this approximation, Fresnel transmission and reflection equations are used to calculate the equivalent surface currents from which the scattering field can be computed by invoking the Huygens principle. Noting that most parts of the targets of interest are concave, the first order PO solution (ignoring multiple reflections within a target) dominates the backscattering response. For random surfaces and volumes, like road surfaces and road surfaces covered with snow, ice, or water, where the target features are comparable or smaller than the wavelength, to achieve accurate results, full-wave methods or approximate analytical can be applied by the electromagnetic field solver 13.

With continued reference to FIG. 2, radar cross-section values are generated until a stop condition is met as indicated at 24. When the stop condition is not met, another set of values for the radar parameters are selected at 25 and radar cross-section values for the given target are determined at 23 using the newly selected set of values for the radar parameters and again varying the values for the one or more target attributes. In the example embodiment, the radar parameters are incidence angle and range, where the incidence angle is varied in a range from 0-360 degrees and the range is varied in a range from 5 to 300 meters. For the initial set of radar parameters, the incidence angle is set at zero and the range is set at five meters. In one example, the incidence angle is varied by one degree and the range is varied by five meters. For each newly selected set of radar parameters, one of the two parameters is incremented in an alternating manner. That is, for a first set of radar parameters, the incidence angle is incremented by one degree while range remains the same, for the second set of radar parameters, the range in incremented by five meters while the incidence angle remains the same and so forth until the stop condition is met. In this example, the stop condition occurs when the entire range of both ranges have been exhausted. These ranges are understood to be illustrative and values for the ranges and increments can vary. Likewise, methods for how to vary the radar parameters can also vary.

From the plurality of radar cross-section values for the given target, a parametric statistical model is constructed at 26 by the model builder 14. In one embodiment, one parametric statistical model is constructed for the given target. The parametric statistical model may be defined by parameters from a distribution function, such as an exponential distribution function, a Lognormal distribution function or a Weibull distribution function. For example, the parametric statistical model may be defined by a mean and the standard deviation of the Lognormal distribution function. In another example, the parametric statistical model may be defined by a mean, the standard deviation, and a covariance matrix of an n-dimensional distribution function, where the distribution function is one of an exponential distribution function, a Lognormal distribution function or a Weibull distribution function. In yet another embodiment, multiple parametric statistical model may be constructed for the given target, where the different models are a function of different camera parameters. For example, the parametric statistical models may be defined by a mean and a standard deviation of the exponential distribution function, where each model is a function of the incidence angle and the range to the given target. These examples are merely illustrative of the types of parametric statistical models which can be constructed for a target.

For distributed targets (such as road surfaces, curb sides, sidewalks, and vegetation), analytical or hybrid empirical/numerical methods are used to model the backscattering coefficient (radar cross section per unit area of the lit area) of the target in terms of its physical parameters. For targets that follow Gaussian statistics, the second moment of the scattered field is sufficient to estimate the probability distribution function (pdf) of the scattered field. Ground reflectivity in specular direction near grazing incidence is rather high (>80%). Ground reflectivity is modeled for different surfaces and used in the simulation tool to account for radar signal reflection from the ground that interacts with object on the road. Basically in addition to direct backscatter from the vehicle, three other scattering components are added. These include: 1) radar reflection from the ground, scattering from the object and back to the radar, 2) direct scattering from the object, reflection from the ground and back to the radar, and 3) reflection from the ground, scattering from the object towards the ground and reflection of that from the ground and back to the radar.

Figure 3:
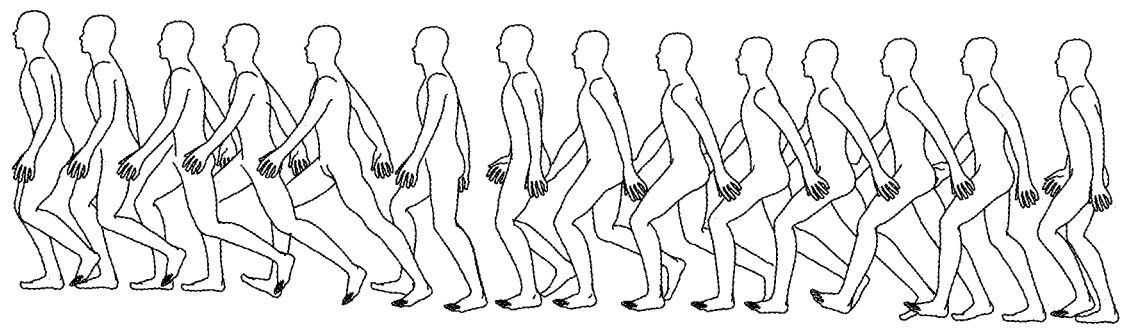
FIG. 3 is a diagram depicting different poses for a person.

To better understand, constructing a model for a pedestrian is described further. Since different poses of human may result in different radar cross-section values, the radar backscatter model for pedestrians are first grouped into two most common actions: walking and running/jogging. For each action, more than ten poses are captured during one period of walking or jogging as shown in FIG. 3. For each pose, the human CAD model is simulated by the electromagnetic field solver 13 for different values of azimuth incidence angles and radar distance to the target (range). Statistical features of radar cross-sections, e.g. the probability distribution function and it parameters such as, mean value, standard deviation or other key parameters of probability density function (PDF) can be found by running Monte-Carlo simulations. In this example, the statistical model for human is developed in terms of height, weight, gender, and age.

Figure 4A:
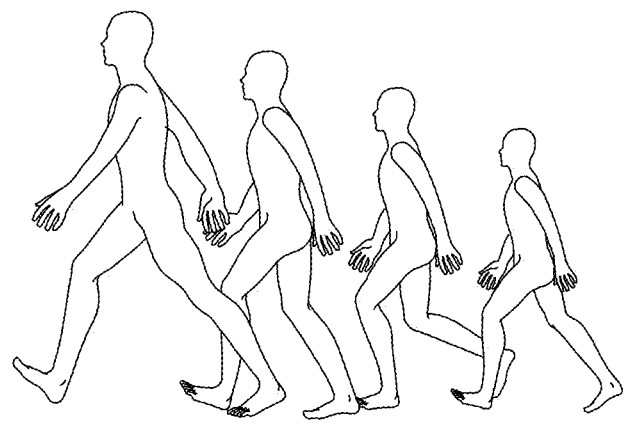
FIGS. 4A and 4B are diagrams showing human models with different heights for a person walking and jogging, respectively.
Figure 4B:
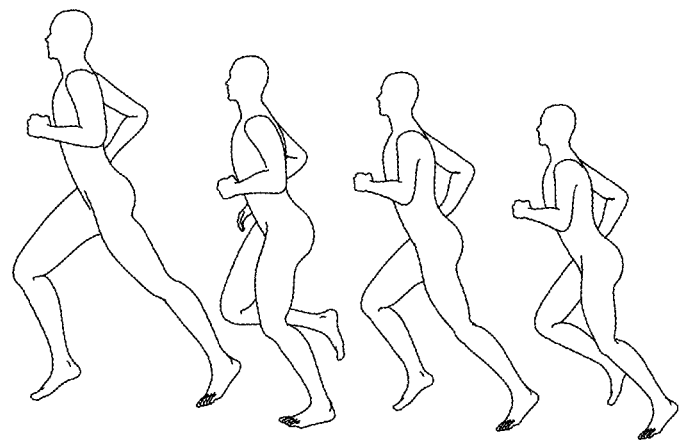
Figure 4C:
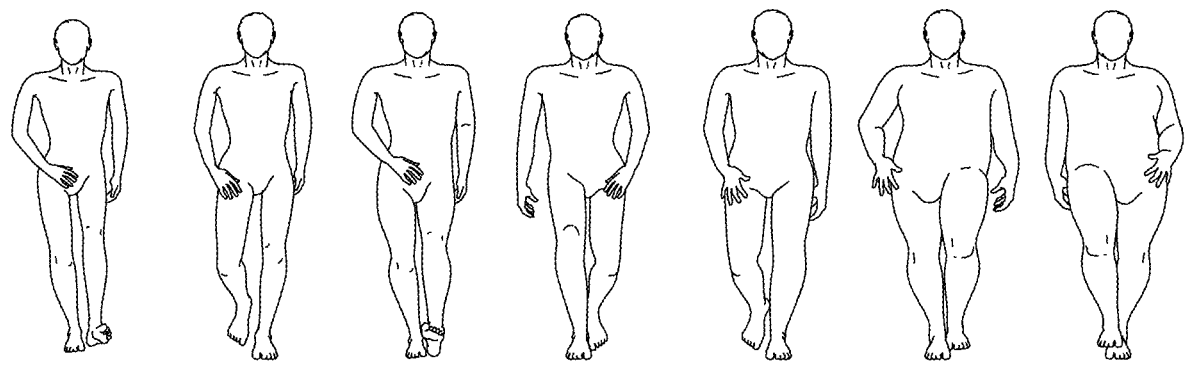
FIG. 4C is a diagram showing human models with different weights for a person walking.

It is expected that the radar response from human subjects be a function of human's geometrical parameters. To develop a comprehensive radar backscatter model, the relations between target parameters and the statistical parameters must be established. For this reason a massive simulation of the human CAD models with different heights, weights and genders is performed. As is shown in FIGS. 4A-4C, human CAD models with various heights and weights are generated and more than 10 poses are simulated for human with each height, weight and gender.

Clearly one's weight is highly correlated to the height, in order to reduce the number of free parameters, relationships that hold between different target parameters are established. To do this, let us denote the standard weight ($w_0$) as the weight for a human with normal shape, for example defined by a human model generation software MakeHuman. The standard weight is a function of human's height, which is found to be:

$w_0(h)=64.38h^2-112.1h+65.78$ (kg) for man $w_0(h)=-0.714h^2+91.73h-95.02$ (kg) for woman Next, a quantity called shape factor (sf) defined as the weight of a human over the standard weight at his/her height (sf=w/$w_0$) can be used to quantify overweight or underweight. For one person with specific weight, height and specific motion, the RCS are simulated as a function of incident angle and range (distance from the radar to the human). The RCS data corresponding to a specified range and incident angle are found to best fit to Weibull distribution, whose probability density function is $$f(x \mid A, B) = \frac{B}{A}\left(\frac{x}{A}\right)^{B-1} \exp\left\{-\left(\frac{x}{A}\right)^B\right\}$$

The value of A and B can be obtained by fitting the RCS data to the Weibull distribution. Due to the angular symmetry of human bodies, the parameters A and B are modeled as Fourier series of azimuth incident angles.

Figure 5A:
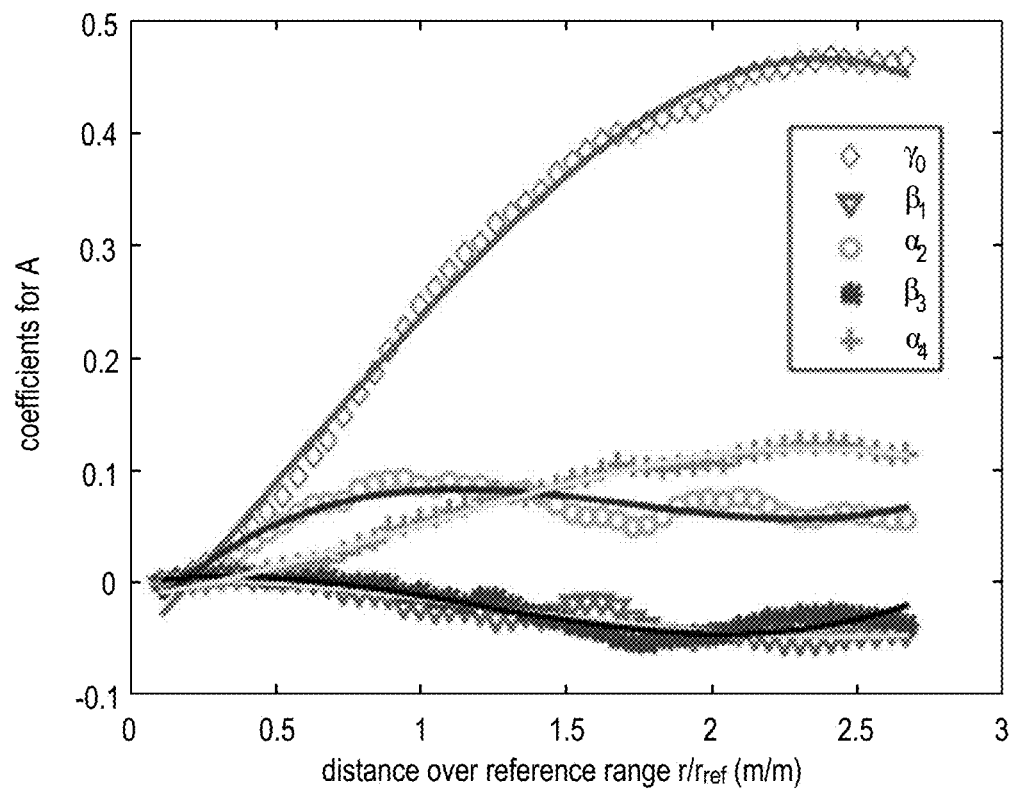
FIGS. 5A and 5B are graphs showing Fourier coefficients as a function of range for different parameters of an example statistical model.
Figure 5B:
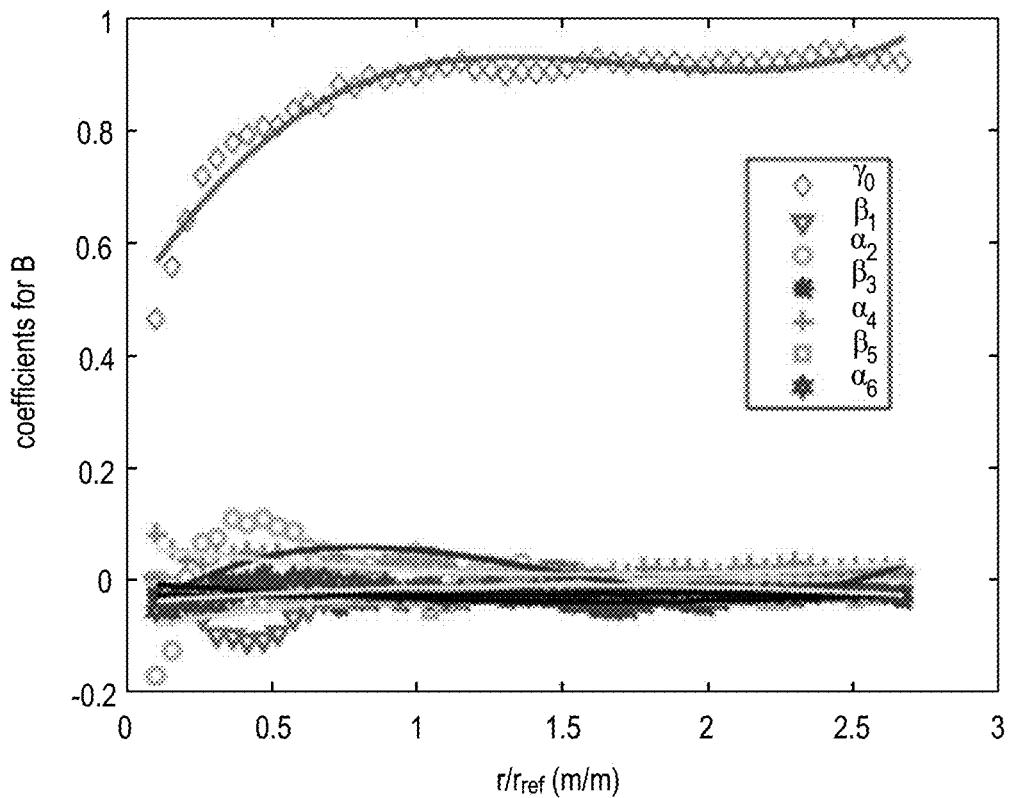

$A(\phi,r)=\beta_1(r)\sin(\phi)+\alpha_2(r)\cos(2\phi)+\beta_3(r)\sin(3\phi)+\alpha_4(r)\cos(4\phi)+\gamma_0(r)(m^2)$ $B(\phi,r)=\beta_1(r)\sin(\phi)+\alpha_2(r)\cos(2\phi)+\beta_3(r)\sin(3\phi)+\alpha_4(r)\cos(4\phi)+\beta_5(r)\sin(5\phi)+\alpha_6(r)\cos(6\phi)+\gamma_0(r)$ Because automotive radars usually have a narrow antenna beam width, to achieve higher azimuthal resolution, the "footprint" of radar's main beam may not fully cover the human bodies and the illuminated area becomes a function of range, this is why the estimated RCS varies with distance between the radar and targets. It is found that when the entire target falls into the radar's footprint, the RCS varying with range is small, and that range is denoted as "reference range" ($R_{ref}$=h/HPBW). The Fourier coefficients for the parameters A and B are fit to polynomial functions of range relative to the reference range, as is shown in FIGS. 5A and 5B.

For vehicles and stationary objects, wideband (e.g., from 76 GHz to 80 GHz) physical optics simulations are performed and the RCS data at specific range and incident angle are fit to Weibull or Lognormal distributions. Due to their random irregular radar response, their statistical features are categorized into lookup tables for different ranges and incident angles. Due to the available vehicle types, the radar response for the same type of vehicles is expected to have similar statistical radar response despite minor differences in geometries. The types of vehicle models integrated into the example embodiment of the radar simulation tool 10 include sedan, SUV, hatchback, pickup truck, bus, motorcycle, bicycle and heavy truck. The stationary objects models include many commonly seen targets on road, e.g. the traffic sign post, traffic lights, lamp post, tree trunk, bus stop and animals, like dog and deer. Some models have been compared with measurement data and good agreements are achieved.

Besides the point targets mentioned above, the distributed targets (like the road surfaces) are modeled as well. Road surfaces are random rough surfaces and the smallest feature may be smaller than the wavelength at millimeter wave frequency, thus PO approximation is not applicable and full-wave analysis is required for accurate results. In the example embodiment, the commercial FEM based full-wave simulation tools AnsysEM were used to perform such simulation, the random rough surfaces are simulated with different roughness (root-mean-square (RMS) height and correlation length), dimensions, elevational angles of incidence, and dielectric constants of road. Massive simulations have been conducted and for each case about 50 realizations are simulated to obtain reliable data. Measurements on road surfaces have been taken for computing the volumetric scattering and to fulfil the ground scattering model. The backscattering coefficients, defined as RCS per unit area, are modeled as a function of incident angles, roughness (RMS height and correlation length of the surface) and the dielectric constant.

Figure 6:
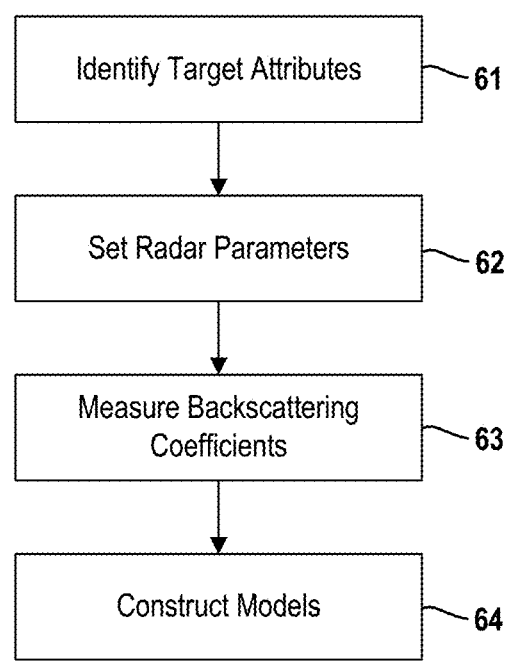
FIG. 6 is a flowchart depicting an example embodiment of another method for constructing a statistical model for distributed targets.

An example method for constructing a statistical model for a given distributed target is further described in relation to FIG. 6. Attributes for the targets are identified at 36. Example attributes for a road surface include (but are not limited to) road type (asphalt, concrete, gravel, etc.) and road condition (dry, wet, snowy, etc.). In the example embodiment, similar to point targets, the attributes for the distributed targets may be specified and/or input using a user interface module 12 of the scene simulator 10.

For distributed targets, their radar response is characterized by backscattering coefficient, which is defined as radar cross section per unit area. The radar parameters can include but are not limited to polarizations and elevational incident angle from the normal direction to the surface. In an example embodiment, the polarizations are VV (sending vertically polarized wave and receiving vertically polarized wave), HH (sending horizontally polarized wave and receiving horizontally polarized wave) and HV (sending horizontally polarized wave and receiving vertically polarized wave) and the incident directions are near grazing with values from 70 degree to 85 degree.

A plurality of backscattering coefficients for a given target and given radar parameters and target attributes are measured at 63 by varying the radar's footprint on the target. For each set of radar parameters, the data are found to follow exponential distribution and therefore merely the mean value of the data can describe all the statistical properties of such random variable. Though backscattering coefficients may be measured for many incident directions and polarizations, only one incident direction and one polarization (either VV or HH) data is sufficient to construct the theoretical backscattering model based on radiative transfer theory for both VV and HH polarization. That is, one set of radar parameters are set as indicated at 63 and then used to construct the models at 64 as further explained below. Measured backscattering coefficients for other incident directions and polarizations can be used as validation for this model.

The radiative transfer theory is an electromagnetic scattering theory based on energy conservation. It is mainly used to describe volumetric scattering, which dominates the backscattering from many distributed targets include concrete or asphalt road. For one layer medium (e.g. only asphalt road), the backscattering coefficients are given by:

$$\sigma_{vv}^0 = \frac{4\pi\cos\theta_0|t_{v01}|^2|t_{v01}|^2 p_1}{2\kappa}$$

$$\sigma_{hh}^0 = \frac{4\pi\cos\theta_0|t_{h10}|^2|t_{h01}|^2 p_1}{2\kappa}$$

where $t_{qij}$ is the Fresnel transmission coefficient for q polarization wave (q=v or h) from layer i to layer j, here layer 0 is air and layer 1 is the road, and $$\frac{p_1}{2\kappa}$$

is a parameter independent of incident angle $\theta_0$ and polarization. This parameter is derived from the radar measurement as described below.

Figure 7A:
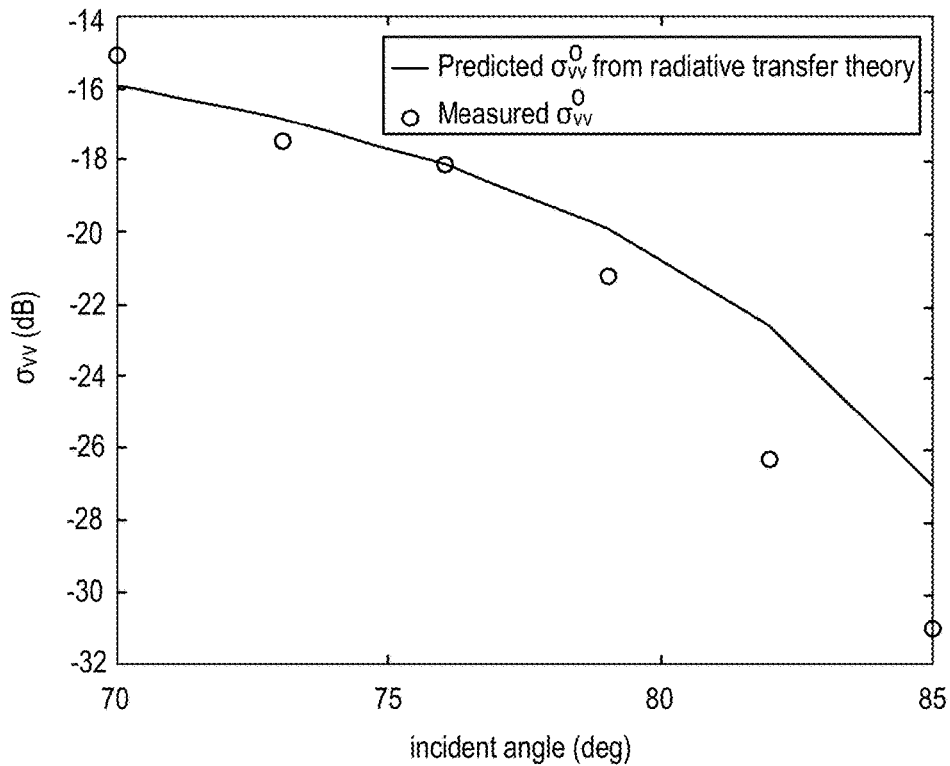
FIGS. 7A and 7B are graph showing a comparison of measured backscattering coefficients and backscattering coefficients calculated using radiative transfer theory.
Figure 7B:
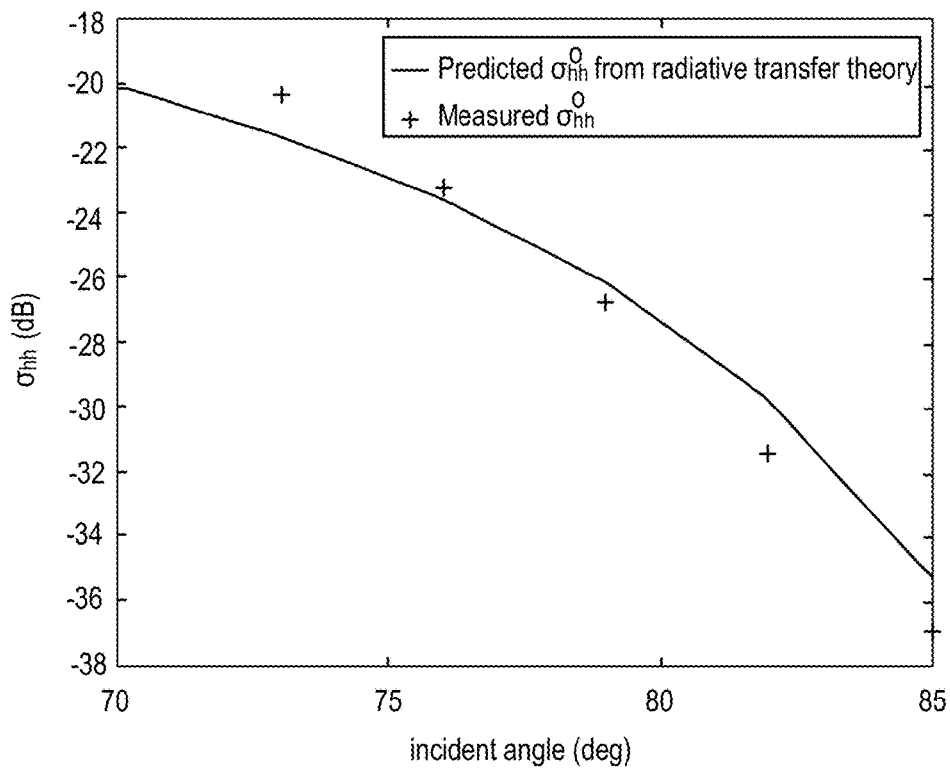

Dry asphalt backscattering coefficient model is taken as an example for better understanding the process of modeling and simulating distributed target. In this example, the backscattering coefficients for dry asphalt are measured with both VV and HH polarizations and elevational incident angles from 70 to 85 degree with 3 degree step. The value of $$\frac{p_1}{2\kappa}$$

is calculated from the backscattering coefficient for 76 degree incidence with VV polarization, and is equal to 0.0063. The comparison of measured backscattering coefficients of other incidence angles and polarization and the backscattering coefficients calculated from radiative transfer theory is shown in FIGS. 7A and 7B.

The error between measurements and predicted values are reasonable. Because the radar 16 in scene simulator 10 will not directly measure the value of backscattering coefficient and instead radar received signal power is proportional to the radar cross section, this can be approximated as average backscattering coefficient multiplied by the area of the footprint of radar's main beam. Because the backscattering coefficient follows exponential distribution, the equivalent radar cross-section can be described by Gamma distribution, with probability density function as $$P(x) = \frac{1}{\Gamma(\alpha)\beta^\alpha} x^{\alpha-1} e^{-\frac{x}{\beta}}$$

where $\alpha$ is the area over 1 m$^2$, and $\beta$ is the mean value of RCS from 1 m$^2$ area of the distributed target (the same value as backscattering coefficient). In scene simulator 10, the radar 16 will generate radar signal for distributed target by the Gamma distribution described above.

Returning to FIG. 1, the statistical models for the different targets can be used in real-time simulation of a scene generated by scene generator 18, for example as captured by a radar 16 equipped to a vehicle. During operation, the radar 16 receives radiation reflected from objects in the scene and inputs the data to an object identifier module 17. The object identifier module 17 is in data communication with a non-transitory data store 15, where the data store 15 stores a plurality of statistical models for targets which may be encountered by the vehicle. It is understood that the statistical models are constructed in the manner set forth above. As used herein, the term module may refer to, be part of, or include an Application Specific Integrated Circuit (ASIC), an electronic circuit, a processor (shared, dedicated, or group) and/or (shared, dedicated or group) that execute one or more software or firmware programs, a combinational logic circuit, and/or other suitable components that provide the described functionality.

More specifically, the object identifier module 17 receives radar cross-sectional values from the radar for different objects in the scene. The radar signals typically undergo signal processing and target isolation before being received by the object identifier module 17. In one embodiment, the radar aspect angle and range are also used to retrieve statistical models from the data store 15. The object identifier module 17 in turn compares the radar cross-sectional values for each object to the statistical models and identifies the objects in the scene. For example, suppose two targets a male pedestrian and a sedan are in the traffic scene. If they are at different range to the radar or moving with different speeds, their radar response signals could be separated. The radar responses behave as random variables and, for each target, the object identifier module 17 will collect large amount data from radar 16 in a short period of time and their statistical features can be summarized. By comparing the radar cross-sectional data for each object to the statistical models 15, the object identifier module 17 can categorize the target to be pedestrian or vehicle.

In other embodiments, a radar target classification algorithm is used to classify the radar response obtained from measurement or simulation. For example, the radar target classification algorithm is implemented with machine learning methods such as artificial neural network and convolutional neural network. The statistical models for all kinds of targets are used to train artificial neural network or convolutional neural network with machine learning techniques in object identifier module 17. The object identifier module 17 treats the radar cross-sectional values for each object as inputs of the trained models or off-line neural network models and identifies the objects in the scene. By putting the radar cross-sectional data for each object into the neural network models, the object identifier module 17 can categorize the target to be pedestrian or vehicle.

Figure 9:
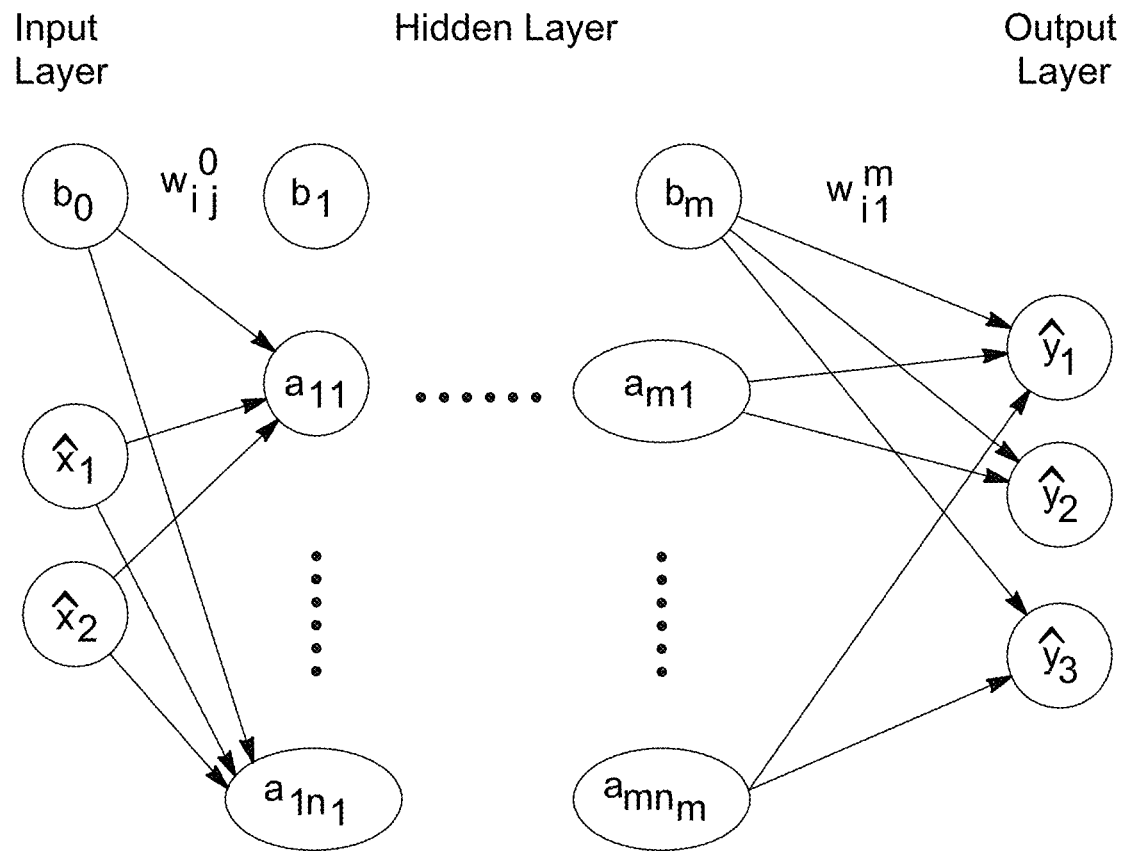
FIG. 9 is a diagram depicting an example structure of an artificial neural network.

One example of neural network model in object identifier module 17 is depicted in FIG. 9. The input values of the artificial neural network $\hat{x}_1$ and $\hat{x}_2$ are normalized values for two statistical features of one target. The normalization means the input data in training set are multiplied and/or added with some coefficients, such that their ranges are between 0 and 1. In one example, the two statistical features can be A and B values in Weibull probability density function. The three output values of the neural network $\hat{y}_1$, $\hat{y}_2$ and $\hat{y}_3$ are the probability of target is identified as pedestrian, vehicle and other stationary objects, respectively. The ranges for the three output values are between 0 and 1, and the object identifier module 17 will identify the target to the category with highest output value.

Figure 10A:
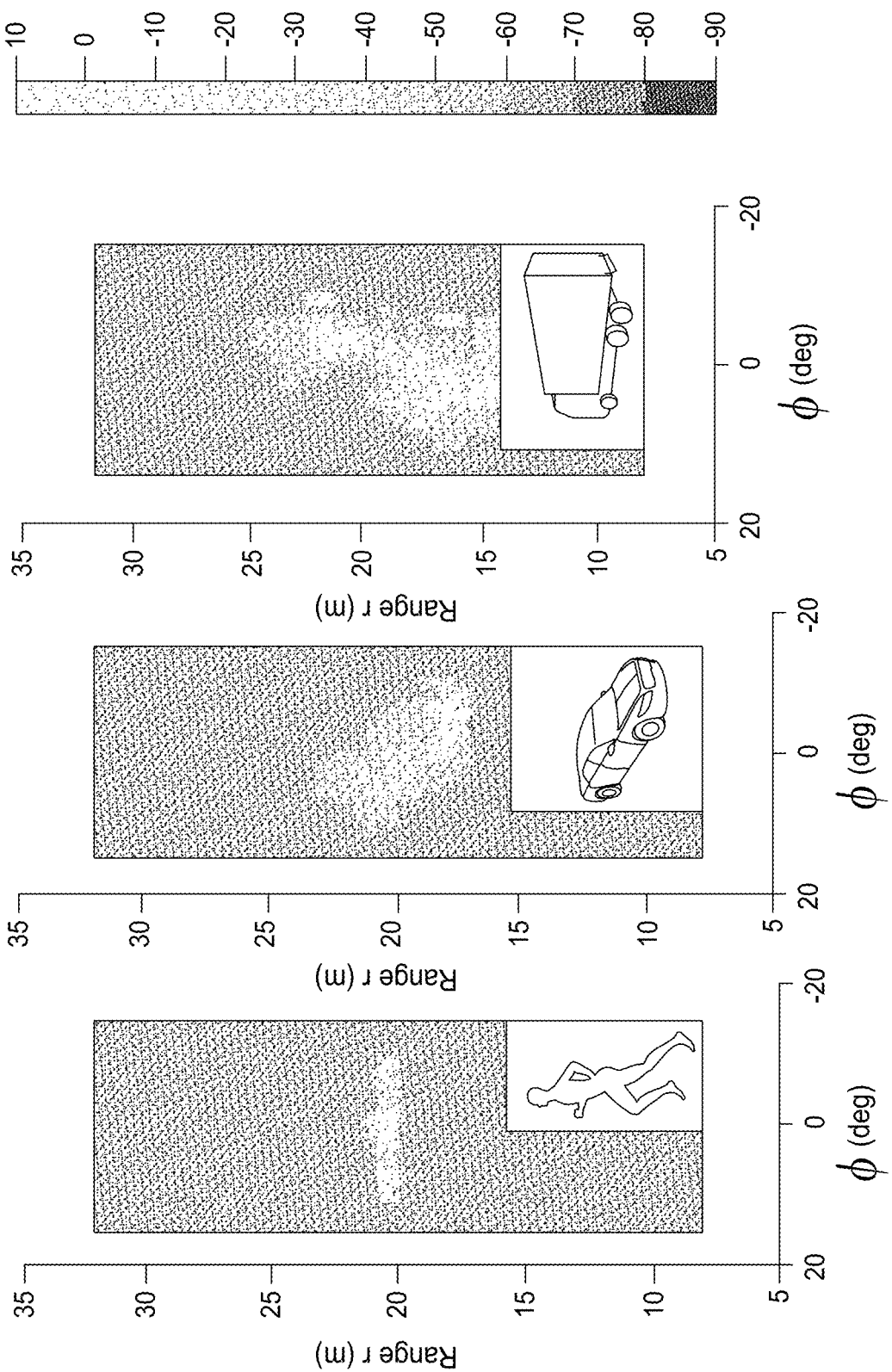

For advanced radar with beam-steering ability in azimuth and/or elevation direction, depending on the aspect angle of radar, a target can be represented by more than one radar cross-sectional values, those radar cross-sectional values forms radar images as shown in FIGS. 10A and 10B. The visualized radar cross-sectional values are in dBsm scale.

One example to identify the object through radar images is convolutional neural network model. The input of the convolutional neural network model are the plurality of radar cross-sectional values of radar images, and the output gives three categories: pedestrian, vehicle and other stationary object. The convolutional neural network is trained with randomly selected 70% of all data from numerical simulation for all kinds of targets with beam-steering radar. The structure of the convolutional neural network includes the plurality of convolutional layers, rectified linear unit layers, pooling layers and fully connected layers as described in FIG. 10C.

The scene generator module 18 visually generates a scene on a display device. In the example embodiment, the scene generator module 18 generates a random number for each object and assigns a radar cross-sectional value to the corresponding object using the application statistical model. In one example, the scene generator module 18 is implemented by the Unreal Engine 4, which is a platform that has many integrated tools for 3D simulations and visualizations although other scene generators are contemplated.

Figure 8:
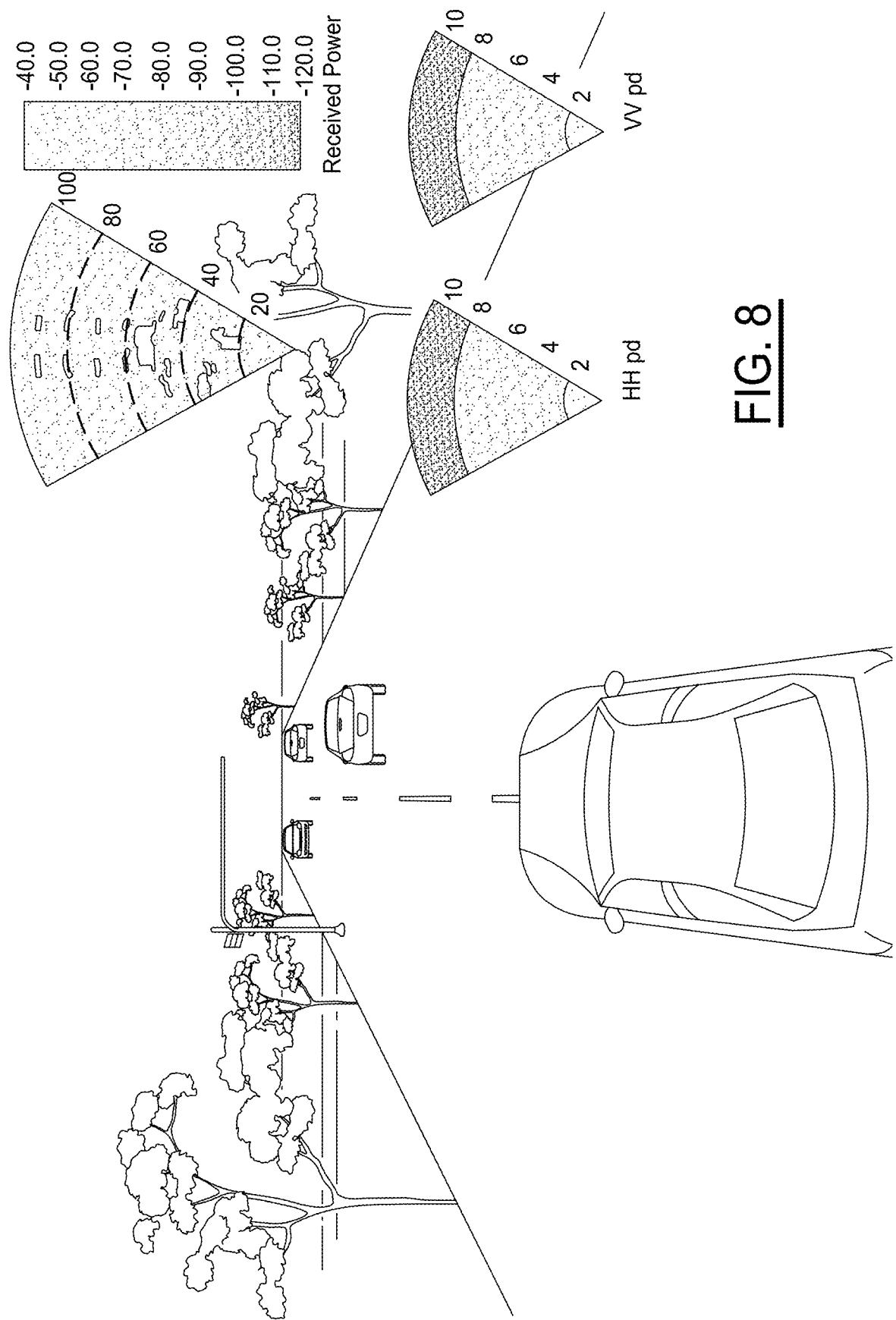
FIG. 8 is an example simulation of a scene generated by the scene simulator.

FIG. 8 shows an example of real-time scene simulation of an automotive radar using the scene simulator 10. The sector map shows in the upper right corner represents the radar image of received power related to the transmitted power from the automotive radar. Here it is assumed that radar's antenna has 3° beamwidth and can scan from 60° to 120° with 1.5° step, and the range resolution is set to be 1 m. The radar response from trees, vehicles and traffic lights can be identified from the radar map. The two small sectors below show the radar response of the ground. QA standard asphalt road is shown in this example. All the radar response can be seen in the image is generated with the statistical models and a random number generator with a specific statistical distribution and parameters derived from the reduced radar statistical models. The simulation presented is an almost real-time simulation, the frame updating rate is about 20-30 frame per second (FPS). All the parameters about the radar including the radar's range and angular resolution, the antenna beamwidth, the maximum range and angular range can be user-defined.

Multidimensional statistical models for different targets are also developed to allow tracking of targets in the scene. Basically correlated random vectors that can provide correlated radar cross section of traffic targets in a dynamic environment. This model allows simulation of the targets backscatter in a continuous manner as these targets gradually change position with respect to the radar. This way the fact that pulse-to-pulse backscatter values are not statistically independent are modeled correctly.

Figure 11B:
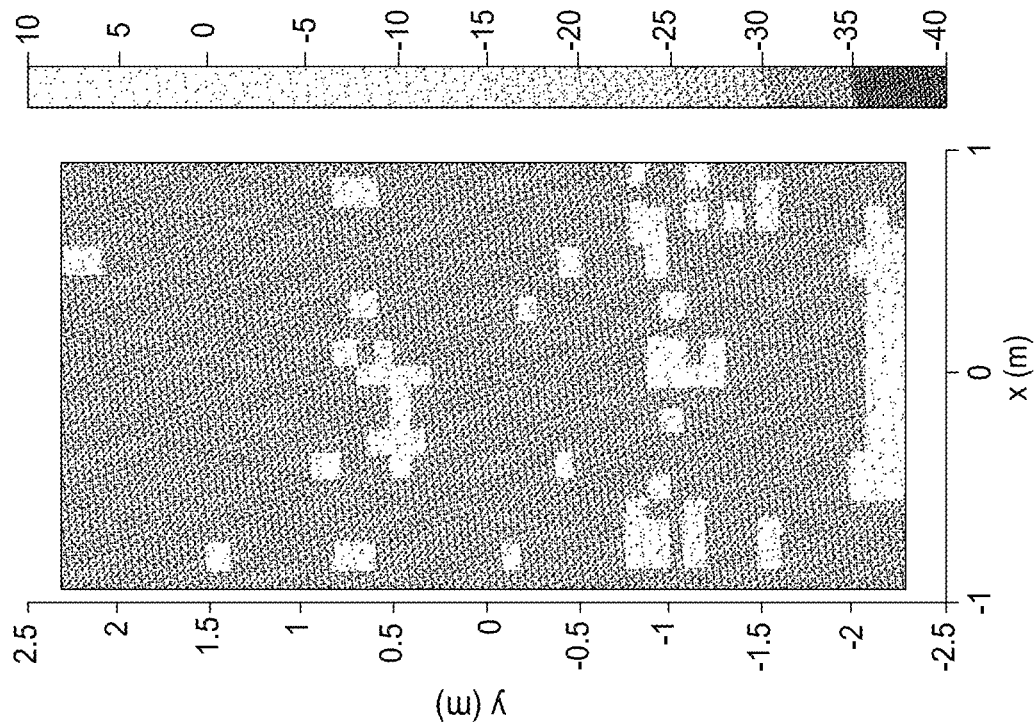
FIGS. 11B and 11C are graphs showing radar cross-sectional values randomly generated for scatters distributed in two-dimensional and three-dimensional space, respectively, of a sedan when illuminated from the back.
Figure 11A:
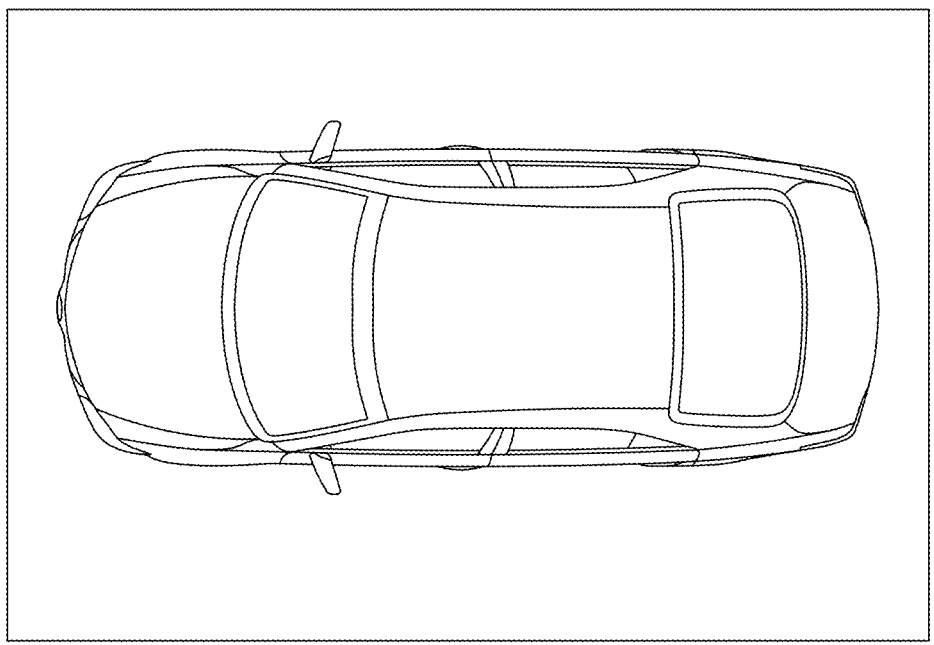
FIG. 11A is a top view of a typical sedan.
Figure 11C:
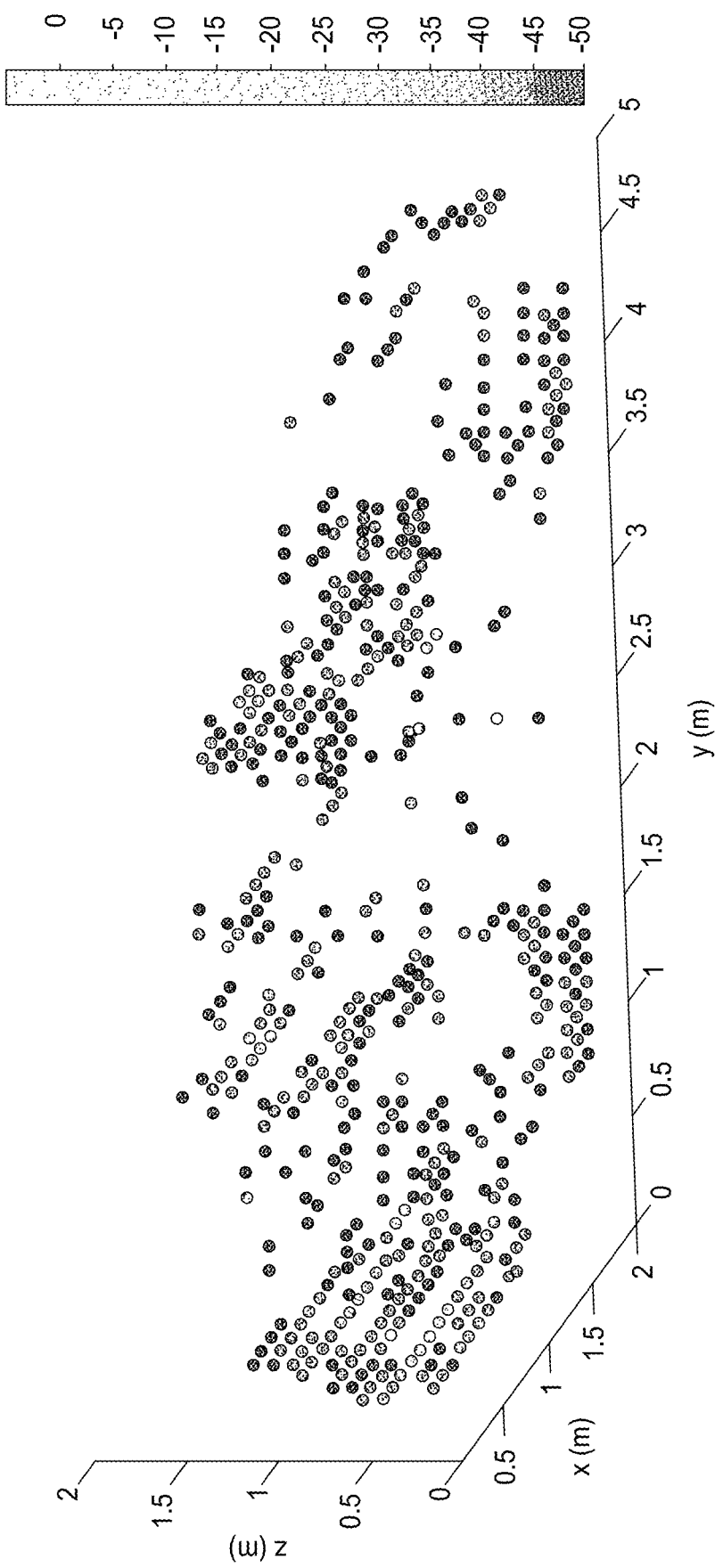

For multiple-input multiple-output radar, targets can be represented with multidimensional statistical models. More specifically, a radar target is represented by more than one scatterer distributed in two-dimensional or three-dimensional space. Each scatter on the target possesses its own statistical features, including positions and radar cross-sectional statistical parameters which are angle dependent. In one embodiment, the random behavior of radar cross-sectional values for each scatter is described by Gamma distribution. The statistical parameters of each scatter are further modeled as functions of incident angle. The method to generate such multidimensional statistical models is the same as shown in FIG. 2. FIG. 11A depicts a typical sedan. FIGS. 11B and 11C illustrate one example of scatters randomly distributed in two-dimensional and three-dimensional space for the sedan depicted in FIG. 11A. In the example, the distance between two closest scatterers is 0.1 m. The positions and radar cross-sectional values are determined by the multidimensional statistical model.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for constructing a reduced statistical model for a given target captured by an automotive radar, comprising:
 identifying, by a computer program executed by a computer processor, one or more attributes for the given target;
 selecting, by the computer program executed by the computer processor, an initial set of values for one or more radar parameters;
 determining, by an electromagnetic field solver executed by the computer processor, a plurality of radar cross-section values for the given target using the initial set of values while randomly varying values for the one or more target attributes, wherein the electromagnetic field solver are computer executable instructions that solve Maxwell equations directly to provide the plurality of radar cross-section values; and
 constructing, by the computer program executed by a computer processor, parametric statistical model for one or more scatters distributed in two-dimensional or three-dimensional space from the plurality of radar cross-section values, where the parametric statistical model represents the given target.

2. The method of claim 1 wherein the given target is further defined as a person and the target attributes include pose, gender, weight and height.

3. The method of claim 1 further comprises selecting a different set of values for the one or more radar parameters; and determining additional radar cross-section values for the given target using the different set of values while randomly varying values for the one or more target attributes.

4. The method of claim 1 further comprises randomly varying values for the one or more target attributes using a Monte Carlo method.

5. The method of claim 1 further comprises determining the plurality of radar cross-section value using a physical optics method.

6. The method of claim 1 wherein the one or more radar parameters include incidence angle with respect to the given target and range to the given target.

7. The method of claim 6 wherein the parametric statistical model is further defined by parameters of one of an exponential distribution function, a Lognormal distribution function or a Weibull distribution function.

8. The method of claim 7 wherein the parameters of one of an exponential distribution function, a Gamma distribution function, a Lognormal distribution function or a Weibull distribution function are derived as a function of the incidence angle with respect to the given target and the range to the given target.

9. The method of claim 1 wherein, for one scatter, the parametric statistical model is further defined by a mean of an exponential distribution function of the plurality of radar cross-section values and a standard deviation of the exponential distribution function of the plurality of radar cross-section values.

10. The method of claim 1 wherein, for more than one scatter, the parametric statistical model is further defined by shape and scale parameters of a gamma distribution function of the plurality of radar cross-section values.

11. The method of claim 10 wherein the parametric statistical model is comprised of a plurality of gamma distribution functions, such that each gamma distribution function corresponds to a different part of the given target.

12. The method for constructing reduced statistical models further comprises categorizing potential targets into groups and, for each group, constructing a parametric statistical model in accordance with the steps of claim 1.

13. The method of claim 1 further comprises generating a scene on a display device, where the scene includes the given target and the given target is derived from the parametric statistical model for the given target.

14. A computer-implemented method for constructing a reduced statistical model for a given target captured by an automotive radar, comprising:
 identifying, by a computer program executed by a computer processor, one or more attributes for the given target;
 selecting, by the computer program executed by a computer processor, a set of values for one or more radar parameters;
 determining, by an electromagnetic field solver executed by the computer processor, a plurality of radar cross-section values for the given target using the initial set of values while randomly varying values for the one or more target attributes; and
 constructing, by the computer program executed by a computer processor, parametric statistical model for the given target from the plurality of radar cross-section values, where the parametric statistical model is further defined by a mean of an exponential distribution function of the plurality of radar cross-section values and a standard deviation of the exponential distribution function of the plurality of radar cross-section values.

15. The method of claim 14 wherein determining a plurality of radar cross-section values includes capturing a first set of radar cross-section values with a radar, defining a function using the first set of radar cross-section values and radiative transfer theory, generating additional sets of radar cross-section value with the function.

16. The method of claim 15 wherein the given target is further defined as a road surface and the target attributes include road type and road condition.

17. The method of claim 16 wherein the one or more radar parameters include polarization and incidence angle with respect to the given target.

18. The method of claim 14 wherein the given target is further defined as a person and the target attributes include pose, gender, weight and height.

19. The method of claim 18 wherein the one or more radar parameters include incidence angle with respect to the given target and range to the given target.

* * * * *